(12) United States Patent
Henderson et al.

(10) Patent No.: US 11,712,700 B1
(45) Date of Patent: Aug. 1, 2023

(54) PORTABLE GRINDER AND CONTAINER

(71) Applicants: Edgar Henderson, Wappingers Falls, NY (US); Jennifer Whitted, Wappingers Falls, NY (US)

(72) Inventors: Edgar Henderson, Wappingers Falls, NY (US); Jennifer Whitted, Wappingers Falls, NY (US)

( * ) Notice: Subject to any disclaimer, the term of this patent is extended or adjusted under 35 U.S.C. 154(b) by 85 days.

(21) Appl. No.: 17/403,963

(22) Filed: Aug. 17, 2021

(51) Int. Cl.
*B02C 18/10* (2006.01)
*A47J 42/34* (2006.01)

(52) U.S. Cl.
CPC .............. *B02C 18/10* (2013.01); *A47J 42/34* (2013.01)

(58) Field of Classification Search
CPC ............. A47J 42/34; A47J 42/38; A47J 42/48
See application file for complete search history.

(56) References Cited

U.S. PATENT DOCUMENTS

| | | | |
|---|---|---|---|
| 8,393,563 B2 | 3/2013 | Chaoui | |
| 8,833,379 B1 * | 9/2014 | Kaplan | A45D 33/26 206/823 |
| D761,064 S | 7/2016 | Dukat | |
| 9,392,908 B2 | 7/2016 | Edwards | |
| 9,943,104 B1 | 4/2018 | Simon | |
| 2012/0168544 A1 * | 7/2012 | Chaoui | A47J 42/24 241/68 |
| 2014/0138465 A1 | 5/2014 | Yen | |
| 2014/0217213 A1 * | 8/2014 | Edwards | A47J 42/38 241/91 |
| 2016/0100715 A1 | 4/2016 | Staiano | |
| 2016/0278430 A1 * | 9/2016 | Shalom | A47J 42/34 |
| 2018/0271328 A1 | 9/2018 | Petrossian | |
| 2019/0357649 A1 * | 11/2019 | Becnel | B67B 7/16 |
| 2022/0071448 A1 * | 3/2022 | Hansen | A47J 42/24 |

FOREIGN PATENT DOCUMENTS

CA        2969861 A1 * 12/2018

* cited by examiner

*Primary Examiner* — Matthew Katcoff
*Assistant Examiner* — Mohammed S. Alawadi
(74) *Attorney, Agent, or Firm* — Kyle A. Fletcher, Esq.

(57) ABSTRACT

The portable grinder and container is a mechanical device. The portable grinder and container is configured for use with a PDD (personal data device) case. The PDD case is configured for use in protecting a personal data device. The portable grinder and container attaches to the PDD case. The portable grinder and container is configured for use with plant based materials. The grinds the plant based materials to release one or more phytochemicals contained in the plant based materials. The portable grinder and container incorporates a first grinder section, a second grinder section, a collection pan, and a threaded connection. The threaded connection secures the second grinder section to the collection pan. The collection pan attaches to the PDD case. The first grinder section magnetically attaches to the second grinder section. The first grinder section and the second grinder section combine to grind the plant based materials.

16 Claims, 7 Drawing Sheets

US 11,712,700 B1

PORTABLE GRINDER AND CONTAINER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of domestic articles, more specifically, mills with grinding or pulverizing members that are hand driven. (A47J42/34)

SUMMARY OF INVENTION

The portable grinder and container is a mechanical device. The portable grinder and container is configured for use with a PDD (personal data device) case. The PDD case is configured for use in protecting a personal data device. The portable grinder and container attaches to the PDD case. The portable grinder and container is configured for use with plant based materials. The grinds the plant based materials to release one or more phytochemicals contained in the plant based materials. The portable grinder and container comprises a first grinder section, a second grinder section, a collection pan, and a threaded connection. The threaded connection secures the second grinder section to the collection pan. The collection pan attaches to the PDD case. The first grinder section magnetically attaches to the second grinder section. The first grinder section and the second grinder section combine to grind the plant based materials.

These together with additional objects, features and advantages of the portable grinder and container will be readily apparent to those of ordinary skill in the art upon reading the following detailed description of the presently preferred, but nonetheless illustrative, embodiments when taken in conjunction with the accompanying drawings.

In this respect, before explaining the current embodiments of the portable grinder and container in detail, it is to be understood that the portable grinder and container is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the portable grinder and container.

It is therefore important that the claims be regarded as including such equivalent construction insofar as they do not depart from the spirit and scope of the portable grinder and container. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
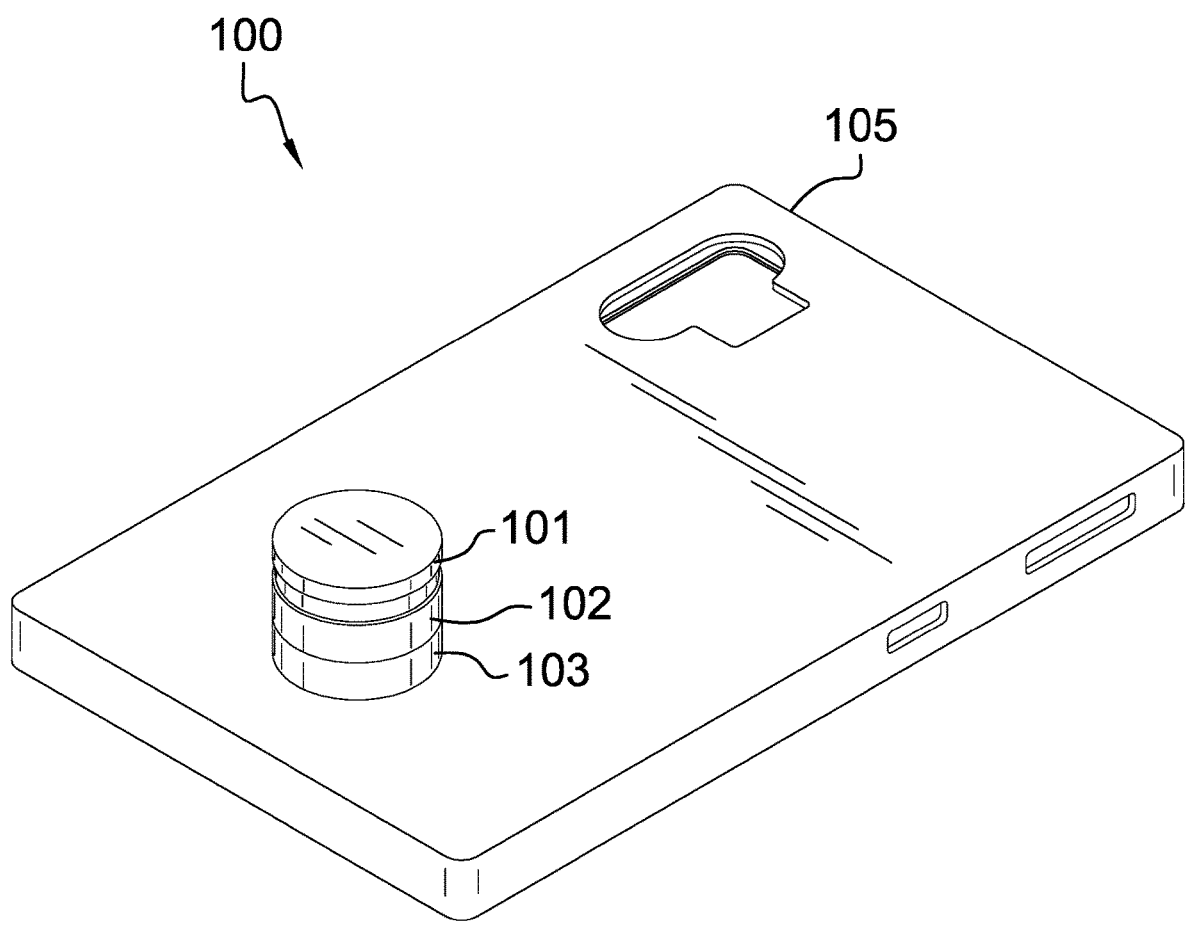
FIG. 1 is a perspective view of an embodiment of the disclosure.
Figure 2:
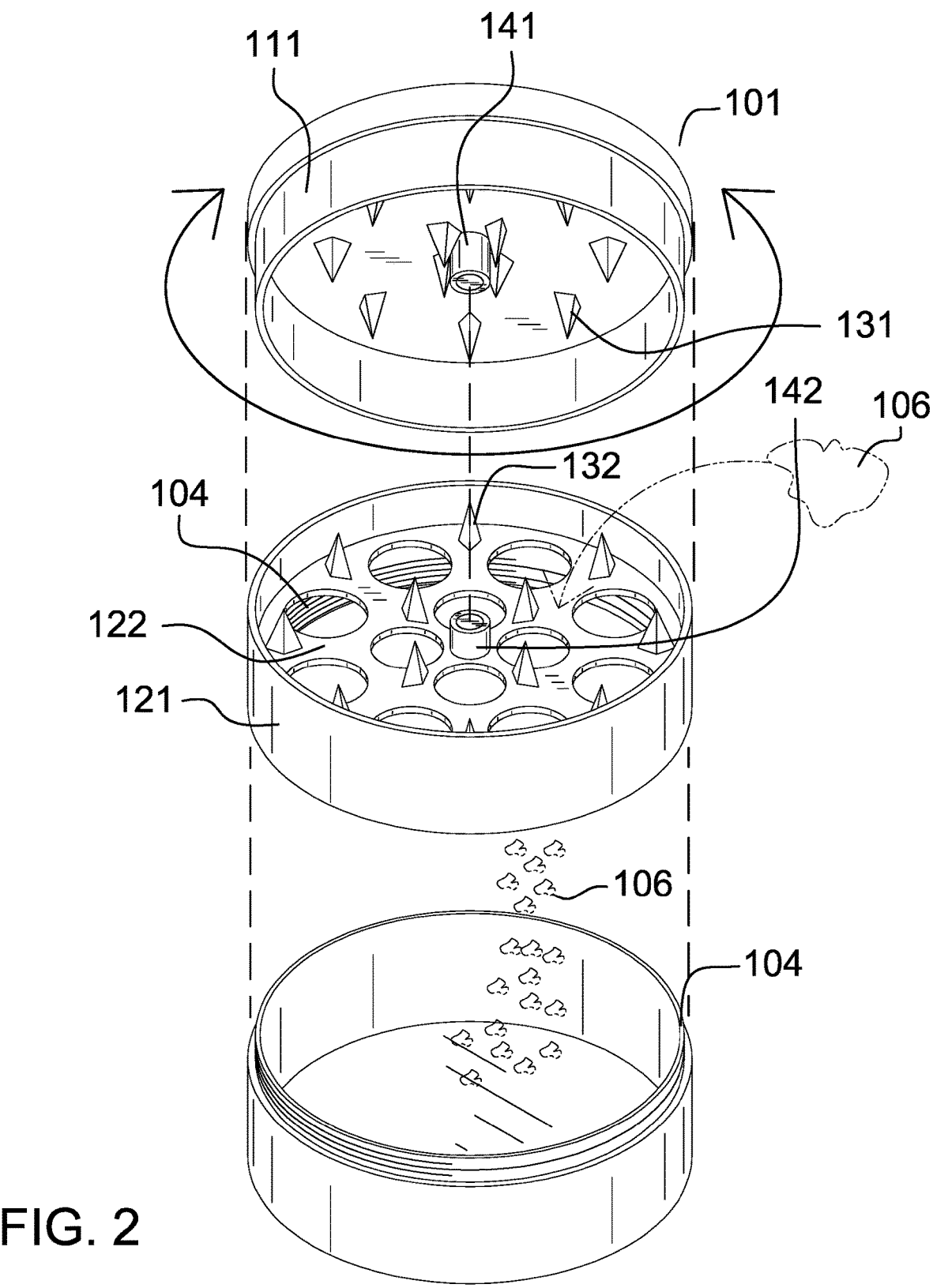
FIG. 2 is an exploded view of an embodiment of the disclosure.
Figure 3:
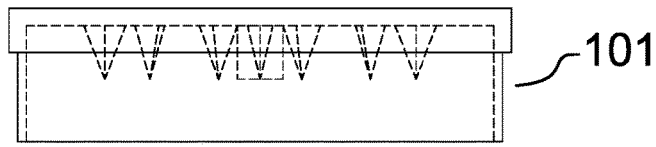
FIG. 3 is a front detail view of an embodiment of the disclosure.
Figure 4:
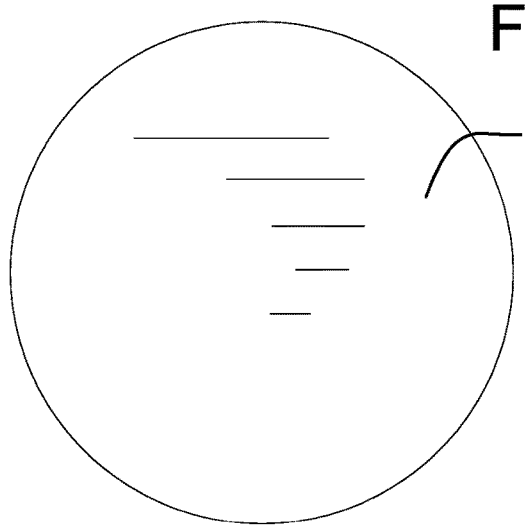
FIG. 4 is a top detail view of an embodiment of the disclosure.
Figure 5:
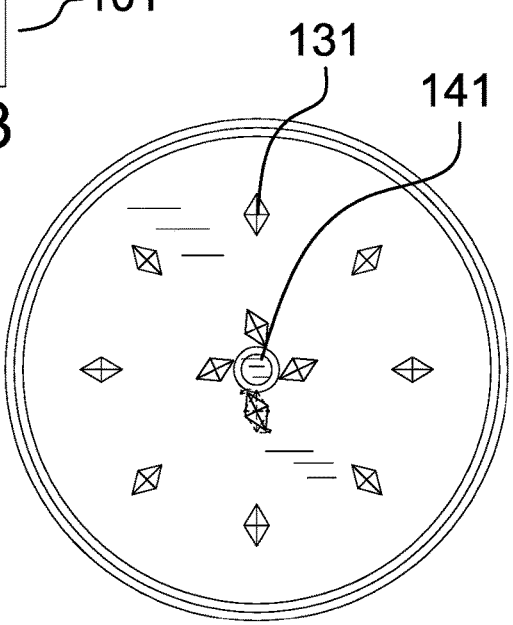
FIG. 5 is a bottom detail view of an embodiment of the disclosure.
Figure 6:
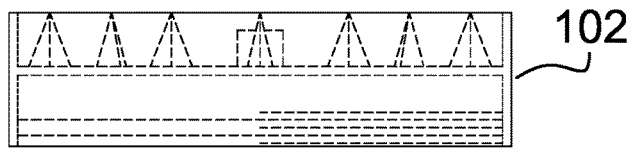
FIG. 6 is a front detail view of an embodiment of the disclosure.
Figure 7:
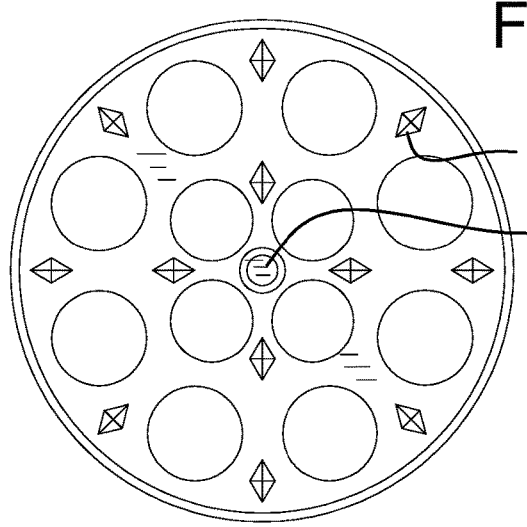
FIG. 7 is a top detail view of an embodiment of the disclosure.
Figure 8:
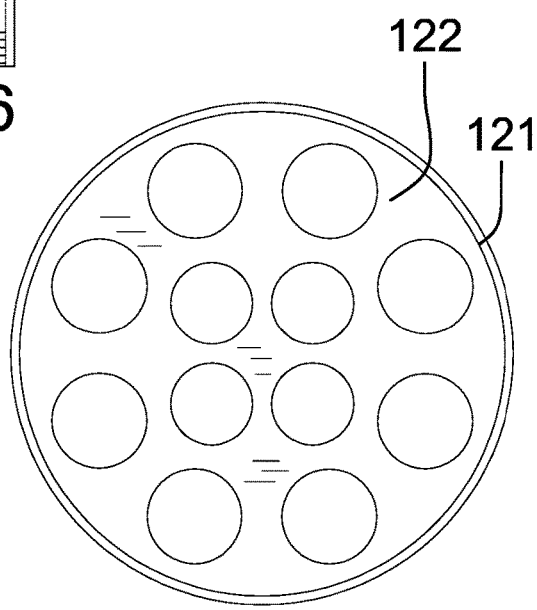
FIG. 8 is a bottom detail view of an embodiment of the disclosure.
Figure 9:
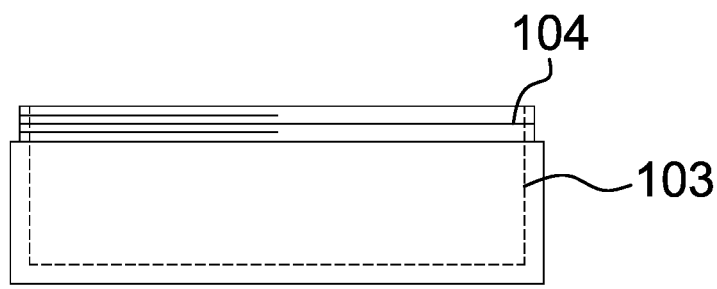
FIG. 9 is a front detail view of an embodiment of the disclosure.
Figure 10:
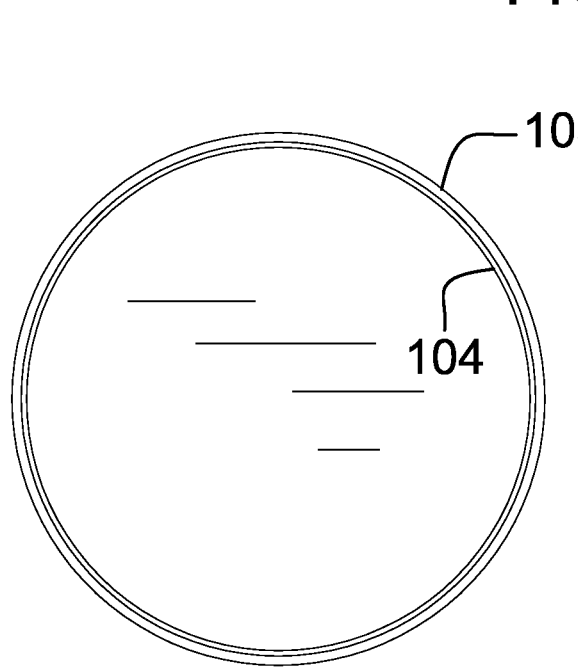
FIG. 10 is a top detail view of an embodiment of the disclosure.
Figure 11:
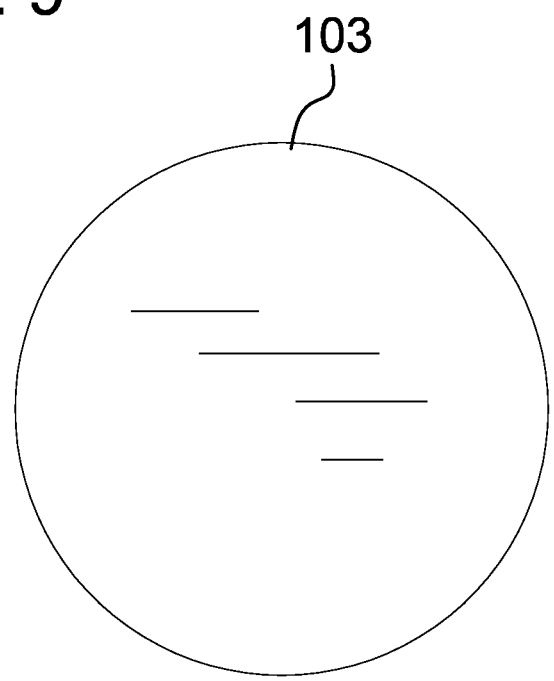
FIG. 11 is a bottom detail view of an embodiment of the disclosure.
Figure 12:
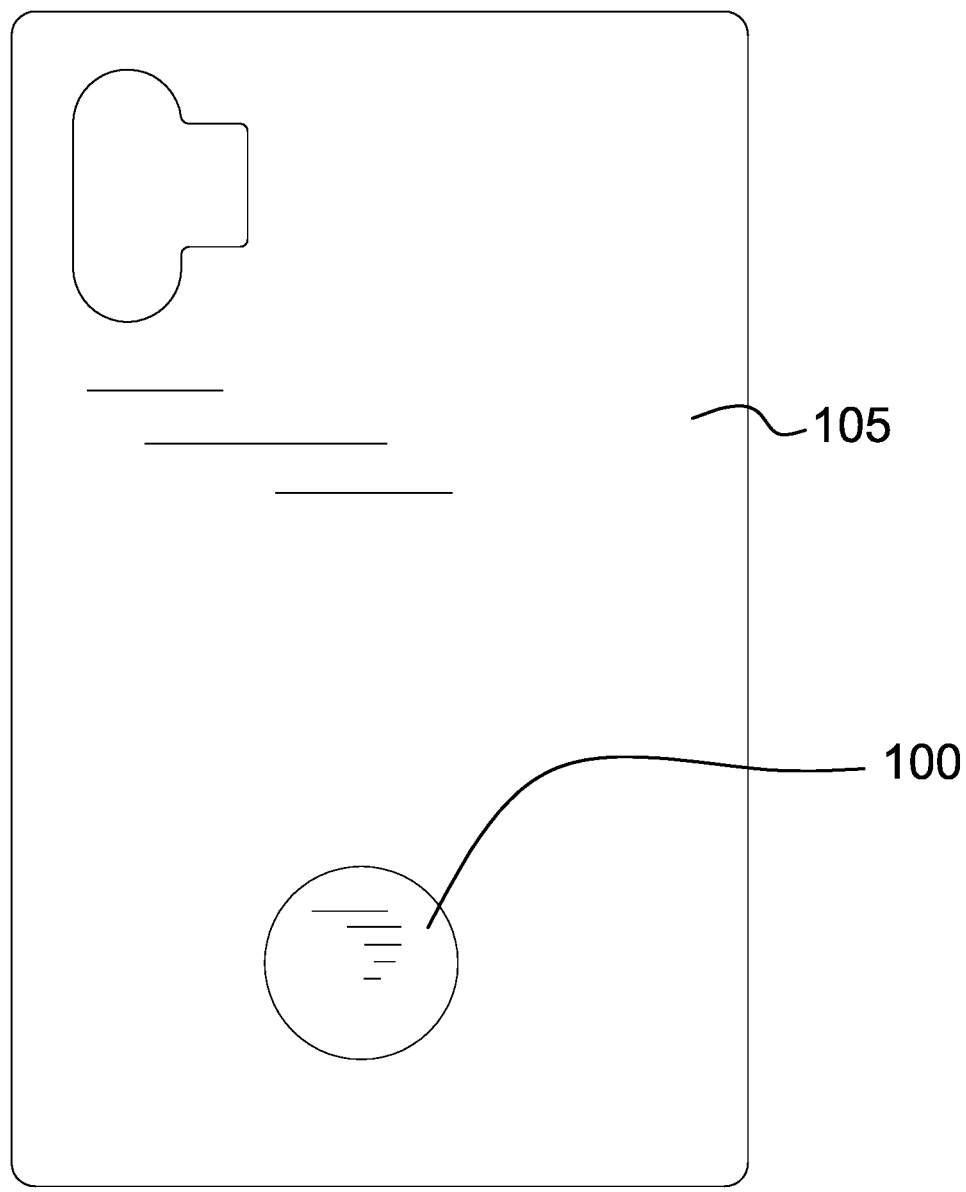
FIG. 12 is an in-use view of an embodiment of the disclosure.
Figure 13:
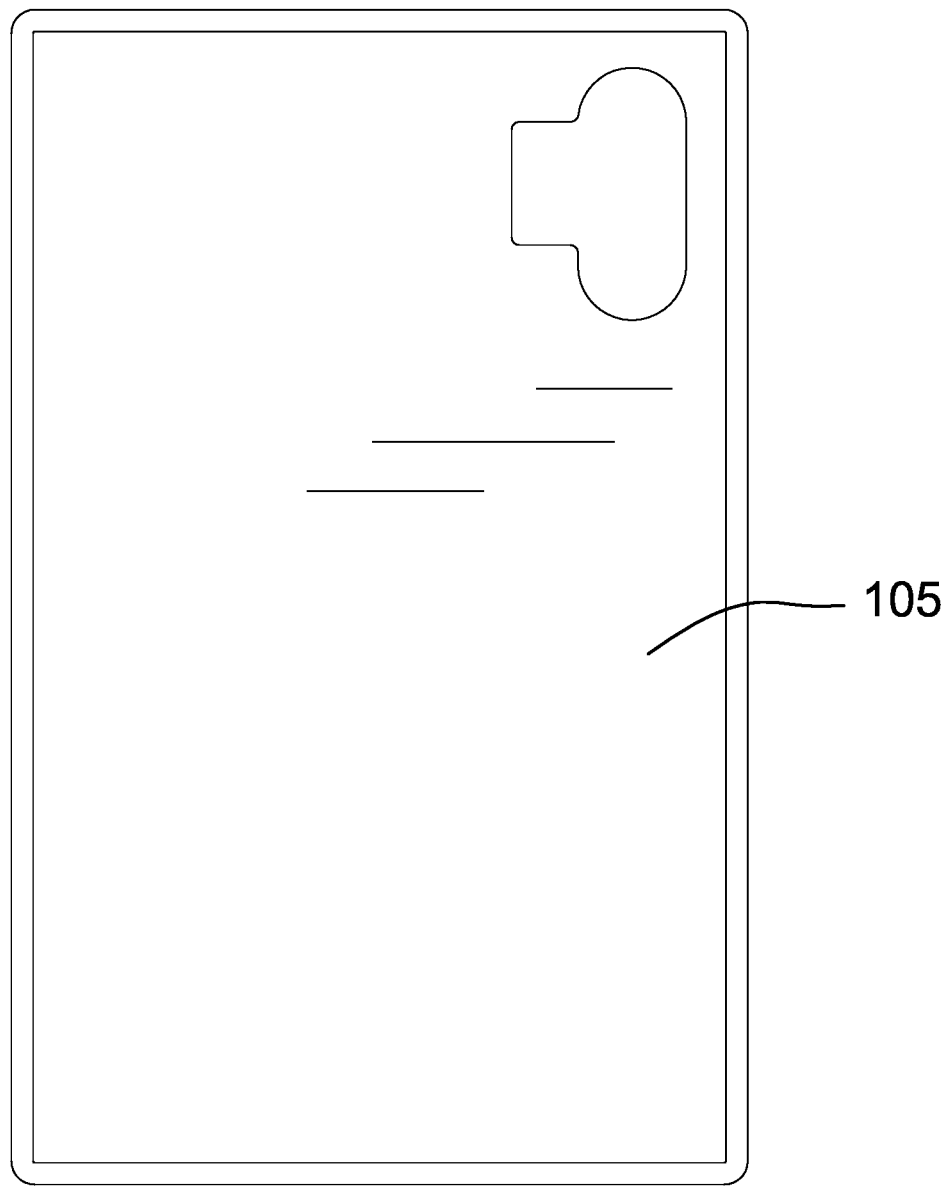
FIG. 13 is a reverse in-use view of an embodiment of the disclosure.
Figures 14, 15:
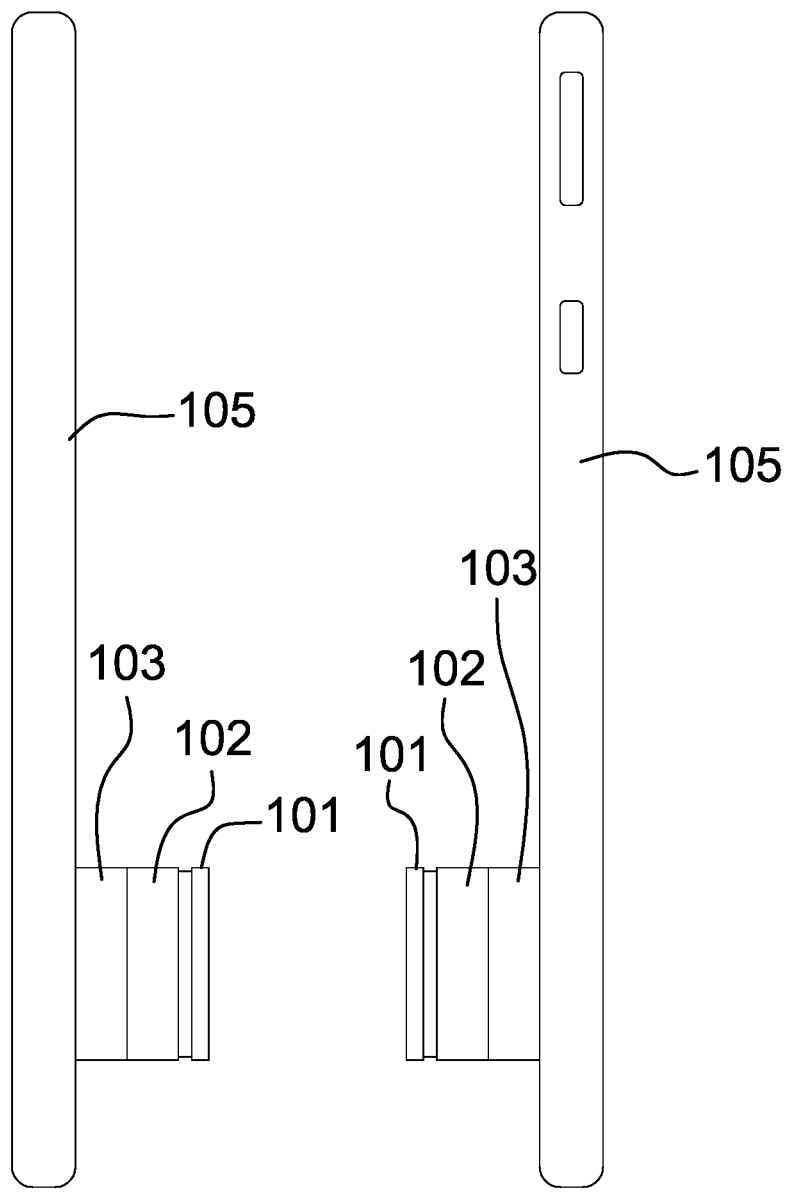
FIG. 14 is a side in-use view of an embodiment of the disclosure.
FIG. 15 is a reverse side in-use view of an embodiment of the disclosure.

Detailed reference will now be made to one or more potential embodiments of the disclosure, which are illustrated in FIGS. 1 through 15.

The portable grinder and container 100 (hereinafter invention) is a mechanical device. The invention 100 is configured for use with a PDD (personal data device) case 105. The PDD case 105 is configured for use in protecting a personal data device. The invention 100 attaches to the PDD case 105. The invention 100 is configured for use with plant based materials 106. The grinds the plant based materials 106 to release one or more phytochemicals contained in the plant based materials 106. The invention 100 comprises a first grinder section 101, a second grinder section 102, a collection pan 103, and a threaded connection 104. The threaded connection 104 secures the second grinder section 102 to the collection pan 103. The collection pan 103 attaches to the PDD case 105. The first grinder section 101 magnetically attaches to the second grinder section 102. The first grinder section 101 and the second grinder section 102 combine to grind the plant based materials 106.

The PDD case 105 is a pan shaped structure. The PDD case 105 is defined elsewhere in this disclosure. The plant based materials 106 forms a source of pharmacologically active media that are derived from plants. The invention 100 grinds the plant based materials 106 to release the phytochemicals necessary to provide the benefits of the pharmacologically active media.

The first grinder section 101 forms a portion of the grinder formed by the invention 100. The first grinder section 101 combines with the second grinder section 102 such that the first grinder section 101 and the second grinder section 102 combine to forms a mechanical structure suitable for grinding plant based materials 106. The first grinder section 101 magnetically attaches to the second grinder section 102 such that the first grinder section 101 rotates relative to the second grinder section 102. The rotation of the first grinder section 101 relative to the second grinder section 102 provides the motive forces required by the invention 100 to grind the plant based materials 106. The first grinder section 101 comprises a grinder pan 111, a first plurality of grinding blades 131, and a first alignment magnet 141.

The grinder pan 111 is a prism shaped structure. The grinder pan 111 is a hollow structure. The grinder pan 111 has a pan shape. The grinder pan 111 forms the structure of the invention 100 that is distal from the PDD case 105. The grinder pan 111 encloses the open congruent face of the second grinder section 102 that is distal from the PDD case 105. The grinder pan 111 contains the first plurality of grinding blades 131 and the first alignment magnet 141.

The first plurality of grinding blades 131 comprises a set of cutting blades. The first plurality of grinding blades 131 mounts in the interior surface of the closed face of the pan structure of the grinder pan 111. The first plurality of grinding blades 131 project into the hollow interior of the grinder pan 111. The first plurality of grinding blades 131 forms a plurality of cutting edges that interact with the second grinder section 102 to grind the plant based materials 106 into a bulk solid structure.

The first alignment magnet 141 is a prism shaped structure. The first alignment magnet 141 is a magnetic structure. The first alignment magnet 141 mounts in the interior surface of the closed face of the pan structure of the grinder pan 111. The first alignment magnet 141 aligns with the center axis of the grinder pan 111 to form a composite prism structure. The first alignment magnet 141 magnetically attaches the grinder pan 111 to the second grinder section 102. The first alignment magnet 141 removably attaches the grinder pan 111 to the second grinder section 102.

The second grinder section 102 forms a portion of the grinder formed by the invention 100. The second grinder section 102 removably attaches to the collection pan 103 such that the second grinder section 102 and the collection pan 103 form a composite prism structure. The first grinder section 101 removably attaches to the second grinder section 102 to form a composite prism structure. The second grinder section 102 is a prism shaped structure. The second grinder section 102 is a hollow structure. The second grinder section 102 is formed as a segmented tube. The segmented tube is defined elsewhere in this disclosure. The first grinder section 101 and the second grinder section 102 combine to grind the plant based materials 106 into a bulk solid structure. The segment tube structure of the second grinder section 102 forms a mesh structure that only allows the bulk solid form of the plant based materials 106 to flow from the second grinder section 102 into the collection pan 103.

The second grinder section 102 comprises a center capped tube 121, a center plate 122, a second plurality of grinding blades 132, and a second alignment magnet 142.

The center capped tube 121 is a prism shaped structure. The center capped tube 121 is a hollow structure. The center capped tube 121 has a tubular structure. The center capped tube 121 is formed as a segmented tube. The congruent end of the center capped tube 121 that is distal from the PDD case 105 attaches to the open face of the grinder pan 111 to form a composite prism structure. The center capped tube 121 attaches to the grinder pan 111 such that the grinder pan 111 and the center capped tube 121 forms a single containment space used to store the plant based materials 106 in preparation for grinding The center plate 122 is a mechanical structure. The center plate 122 is a mesh structure. The center plate 122 forms the central barrier structure characteristic of a segmented tube. The mesh structure of the center plate 122 allows the bulk solid form of the ground plant based materials 106 to pass through the center plate 122 and into the collection pan 103.

The second plurality of grinding blades 132 comprises a set of cutting blades. The second plurality of grinding blades 132 mounts on the surface of the center plate 122 that is proximal to the first plurality of grinding blades 131 of the first grinder section 101. The position of each of the second plurality of grinding blades 132 is selected such that the second plurality of grinding blades 132 interacts with the first plurality of grinding blades 131. Specifically, the first plurality of grinding blades 131 rotates relative to the second plurality of grinding blades 132 such that the first plurality of grinding blades 131 and the second plurality of grinding blades 132 combine to grind the plant based materials 106 into a bulk solid format. The angle of each of the second plurality of grinding blades 132 relative to the blades of the first plurality of grinding blades 131 are selected such that the ground plant based materials 106 guided in a consistent direction through the center capped tube 121 of the second grinder section 102.

The second alignment magnet 142 is a disk shaped structure. The second alignment magnet 142 has a ring shape. The second alignment magnet 142 mounts on the center plate 122. The center axis of the ring structure of the second alignment magnet 142 aligns with the center axis of the center plate 122. The ring structure of the second alignment magnet 142 is sized to receive the first alignment magnet 141. The second alignment magnet 142 magnetically attracts the first alignment magnet 141 such that the first alignment magnet 141 removably attaches to the second alignment magnet 142. The first alignment magnet 141 magnetically attaches the first grinder section 101 to the second alignment magnet 142. The second alignment magnet 142 is positioned relative to the first alignment magnet 141 such that the first grinder section 101 properly aligns with the second grinder section 102.

The collection pan 103 is a prism shaped structure. The collection pan 103 has a pan shape. The collection pan 103 forms the structure of the invention 100 that collects the plant based materials 106 in the bulk solid format. The collection pan 103 attaches to the PDD case 105 using an adhesive. The exterior surface of the closed face of the collection pan 103 attaches to the exterior surface of the closed face of the pan structure of the PDD case 105.

The threaded connection 104 is a mechanical structure. The threaded connection 104 is a fastening device. The threaded connection 104 is defined elsewhere in this disclosure. The threaded connection 104 removably attaches the second grinder section 102 to the collection pan 103. The threaded connection 104 forms a fluid impermeable seal that contains the ground plant based materials 106 within the containment space of the collection pan 103.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Armor: As used in this disclosure, armor refers to a rigid structure used to form a guard that creates a protected space.

Barrier: As used in this disclosure, a barrier is a physical obstacle that forms a boundary between a first space and a second space. The barrier prevents the passage of an object between the first space and the second space.

Bulk Solid: As used in this disclosure, a bulk solid is a material that is formed from an accumulation of discrete particles. While the discrete particles of the bulk solid are solid materials, in aggregate the physical performance of bulk solid will exhibit fluid characteristics such as flow or taking the shape of a container.

Burr Grinder: As used in this disclosure, a burr grinder is a type of grinder. The burr grinder grinds material that is place between two rotating abrasive surfaces. The burr grinder is known for grinding material into particles of a consistent size. The burr grinder is also known as a burr mill.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center Capped Tube: As used in this disclosure, a center capped tube is a tube with a first open end, a second open end, and a barrier that is fabricated within the tube. The barrier prevents the flow of liquid or gas from the first open end of the tube through to the second open end of the tube.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Exterior: As used in this disclosure, the exterior is used as a relational term that implies that an object is not contained within the boundary of a structure or a space.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grinder: As used in this disclosure, a grinder is a machine that reduces a material into small particles.

Interior: As used in this disclosure, the interior is used as a relational term that implies that an object is contained within the boundary of a structure or a space.

Liquid: As used in this disclosure, a liquid refers to a state (phase) of matter that is fluid and that maintains, for a given pressure, a fixed volume that is independent of the volume of the container.

Magnet: As used in this disclosure, a magnet is an ore, alloy, or other material that has its component atoms arranged so the material exhibits properties of magnetism such as: 1) attracting other iron-containing objects; 2) attracting other magnets; or, 3) or aligning itself in an external magnetic field. A magnet is further defined with a north pole and a south pole. By aligning with an external magnetic field is meant that the north-south pole structure of a first magnet will align with the north south pole of a second magnet. The pole of any first magnet will attract the opposite pole of any second magnet (i.e. a north pole will attract a south pole).

Magnetic Material: As used in this disclosure, a magnetic material is a substance that attracts or is attracted to a magnet but that itself has no net magnetic moment (beyond any residual moment created by prior use). Common classes of magnetic materials include ferromagnetic, diamagnetic, paramagnetic, ferrimagnetic and antiferromagnetic.

Mesh: As used in this disclosure, the term mesh refers to an openwork fabric made from threads, yarns, cords, wires, or lines that are woven, knotted, or otherwise twisted or intertwined at regular intervals. Synonyms for mesh include net. A mesh structure formed from metal bars or wires is often referred to as a grate.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

PDD: As used in this disclosure, PDD is an acronym for personal data device.

PDD Case: As used in this disclosure, a PDD case is a pan shaped armor structure. The PDD case is configured for use with a personal data device. The personal data device inserts into the PDD case. The PDD case creates a protected space for the personal data device. The PDD case is formed with the form factors and apertures necessary to allow for the operation of the personal data device.

Personal Data Device: As used in this disclosure, a personal data device is a handheld logical device that is used for managing personal information and communication. Examples of personal data device include, but are not limited to, cellular phones, tablets, and smartphones.

Pharmacologically Active Media: As used in this disclosure, a pharmacologically active media refers to a chemical substance that has a biochemical or physiological effect on a biological organism.

Phase: As used in this disclosure, phase refers to the state of the form of matter. The common states of matter are solid, liquid, gas, and plasma.

Phytochemical: As used in this disclosure, a phytochemical is a pharmacologically active media that is produced in and harvested from a plant. Within this disclosure, a phytochemical comprises a pharmacologically active media containing one or more chemical groups selected from the group consisting of: a) the flavonoid chemical group; b) the terpenoid chemical group (including the carotenoid chemical subgroup of the terpenoid chemical group); c) polyphenol chemical group; d) the polyacetylene chemical group; e) the biological thiol chemical group; and, f) the biological alkaloid chemical group.

Plant: As used in this disclosure, a plant is a biological organism: 1) that is not capable of movement over significant distances; and 2) that uses photosynthesis to create nutrients. The structure of the plant where photosynthesis occurs is called the leaf. A stationary biological organism that is not capable of movement over significant distances but does not use photosynthesis is referred to as a parasitic plant. In the vernacular, the term plant will often include parasitic plants. The intention of this disclosure is to include parasitic plants in the definition of plant.

Plasma: As used in this disclosure, plasma refers to a state (phase) of matter wherein the outer valence electrons of an atom (or molecule) have been separated from their nucleus but remain with the matter. A plasma is an electrically neutral state of matter that is formed from the ions of the separated atoms. Plasmas generally, but not necessarily behaves like a gas in that a plasma fills the volume of the structure that contains it. The flow of a plasma through the atmosphere is called an arc. An arc is generally created when the atmosphere is subjected to an electric field that ionizes the molecules forming the atmosphere.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains an environment suitable within the protected space that is appropriate for the object; or, c) protects the object within the protected space from potential dangers that are outside of the protected space.

Ring: As used in this disclosure, a ring is term that is used to describe a disk-like structure through which an aperture is formed. Rings are often considered loops.

Segmented Tube: As used in this disclosure, a segmented tube is a center capped tube wherein the barrier is formed as a barrier structure that is semipermeable to a fluid. An example of such a structure is a filter. The barrier impedes or processes the fluid as it flows from the first open end of the tube through to the second open end of the tube.

Solid: As used in this disclosure, a solid refers to a state (phase) of matter that: 1) has a fixed volume; and, 2) does not flow.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Tube: As used in this disclosure, a tube is a hollow prism-shaped device formed with two open congruent ends. The tube is used for transporting liquids (including bulk solids) and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

With respect to the above description, it is to be realized that the optimum dimensional relationship for the various components of the invention described above and in FIGS. 1 through 15 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A portable grinder and container comprising a first grinder section, a second grinder section, a collection pan, and a threaded connection;
    wherein the first grinder section attaches to the second grinder section; wherein the threaded connection secures the second grinder section to the collection pan;
    wherein the portable grinder and container are configured to use with a personal data device case (hereinafter PDD case);
    wherein the portable grinder and container attach to the PDD case;
    wherein the portable grinder and container are configured to use with plant based materials;
    wherein the collection pan has a pan shape; wherein the collection pan forms the structure of the portable grinder and container that collects the plant based materials;
    wherein the collection pan attaches to the PDD case by using an adhesive;
    wherein an exterior surface of a closed face of the collection pan attaches to an exterior surface of a closed face of the pan structure of the PDD case.

2. The portable grinder and container according to claim 1 wherein the collection pan attaches to the PDD case.

3. The portable grinder and container according to claim 2
    wherein the first grinder section forms a portion of the grinder formed by the portable grinder and container;
    wherein the first grinder section combines with the second grinder section such that the first grinder section and the second grinder section combine to forms a mechanical structure that grinds the plant based materials.

4. The portable grinder and container according to claim 3
    wherein the first grinder section magnetically attaches to the second grinder section such that the first grinder section rotates relative to the second grinder section;
    wherein the rotation of the first grinder section relative to the second grinder section provides the motive forces required by the portable grinder and container to grind the plant based materials.

5. The portable grinder and container according to claim 4
    wherein the second grinder section removably attaches to the collection pan such that the second grinder section and the collection pan form a composite structure;
    wherein the first grinder section removably attaches to the second grinder section to form a composite structure.

6. The portable grinder and container according to claim 5
    wherein the second grinder section is a hollow structure;
    wherein the second grinder section is formed as a segmented tube;
    wherein the first grinder section and the second grinder section combine to grind the plant based materials into a bulk solid structure;
    wherein the segment tube structure of the second grinder section forms a mesh structure that only allows the bulk solid form of the plant based materials to flow from the second grinder section into the collection pan.

7. The portable grinder and container according to claim 6
    wherein the threaded connection is a mechanical structure;
    wherein the threaded connection is a fastening device;
    wherein the threaded connection removably attaches the second grinder section to the collection pan;
    wherein the threaded connection forms a fluid impermeable seal that contains the ground plant based materials within the containment space of the collection pan.

8. The portable grinder and container according to claim 7
wherein the first grinder section comprises a grinder pan, a first plurality of grinding blades, and a first alignment magnet;
wherein the first plurality of grinding blades and the first alignment magnet attach to the grinder pan.

9. The portable grinder and container according to claim 8
wherein the second grinder section comprises a center capped tube, a center plate, a second plurality of grinding blades, and a second alignment magnet;
wherein the center plate attaches to the center capped tube;
wherein the second plurality of grinding blades and the second alignment magnet attach to the center plate.

10. The portable grinder and container according to claim 9
wherein the grinder pan is a hollow structure;
wherein the grinder pan has a pan shape;
wherein the grinder pan forms the structure of the portable grinder and container that is distal from the PDD case;
wherein the grinder pan encloses the open congruent face of the second grinder section that is distal from the PDD case.

11. The portable grinder and container according to claim 10
wherein the first plurality of grinding blades comprises a set of cutting blades;
wherein the first plurality of grinding blades mounts in the interior surface of the closed face of the pan structure of the grinder pan;
wherein the first plurality of grinding blades project into the hollow interior of the grinder pan;
wherein the first plurality of grinding blades forms a plurality of cutting edges that interact with the second grinder section to grind the plant based materials into a bulk solid structure.

12. The portable grinder and container according to claim 11
wherein the first alignment magnet is a magnetic structure;
wherein the first alignment magnet mounts in the interior surface of the closed face of the pan structure of the grinder pan;
wherein the first alignment magnet aligns with the center axis of the grinder pan to form a composite structure;
wherein the first alignment magnet magnetically attaches the grinder pan to the second grinder section;
wherein the first alignment magnet removably attaches the grinder pan to the second grinder section.

13. The portable grinder and container according to claim 12
wherein the center capped tube is a hollow structure;
wherein the center capped tube has a tubular structure;
wherein the center capped tube is formed as a segmented tube;
wherein the congruent end of the center capped tube that is distal from the PDD case attaches to the open face of the grinder pan to form a composite structure;
wherein the center capped tube attaches to the grinder pan such that the grinder pan and the center capped tube forms a single containment space.

14. The portable grinder and container according to claim 12
the center plate is a mechanical structure;
wherein the center plate is a mesh structure;
wherein the center plate forms the central barrier structure characteristic of a segmented tube;
wherein the mesh structure of the center plate allows the bulk solid form of the ground plant based materials to pass through the center plate and into the collection pan.

15. The portable grinder and container according to claim 14
wherein the second plurality of grinding blades comprises a set of cutting blades;
wherein the second plurality of grinding blades mounts on the surface of the center plate that is proximal to the first plurality of grinding blades of the first grinder section;
wherein the position of each of the second plurality of grinding blades is selected such that the second plurality of grinding blades interacts with the first plurality of grinding blades;
wherein specifically, the first plurality of grinding blades rotates relative to the second plurality of grinding blades such that the first plurality of grinding blades and the second plurality of grinding blades combine to grind the plant based materials into a bulk solid format;
wherein the angle of each of the second plurality of grinding blades relative to the blades of the first plurality of grinding blades are selected such that the ground plant based materials guided in a consistent direction through the center capped tube of the second grinder section.

16. The portable grinder and container according to claim 15
wherein the second alignment magnet is a disk shaped structure;
wherein the second alignment magnet has a ring shape;
wherein the second alignment magnet mounts on the center plate;
wherein the center axis of the ring structure of the second alignment magnet aligns with the center axis of the center plate;
wherein the ring structure of the second alignment magnet is sized to receive the first alignment magnet;
wherein the second alignment magnet magnetically attracts the first alignment magnet such that the first alignment magnet removably attaches to the second alignment magnet;
wherein the first alignment magnet magnetically attaches the first grinder section to the second alignment magnet;
wherein the second alignment magnet is positioned relative to the first alignment magnet such that the first grinder section properly aligns with the second grinder section.

* * * * *